United States Patent
Fleizach et al.

(10) Patent No.: US 10,571,556 B2
(45) Date of Patent: Feb. 25, 2020

(54) FREQUENCY MODULATED CONTINUOUS WAVE RADAR DETECTOR

(71) Applicant: The United States of America as represented by the Secretary of the Navy, San Diego, CA (US)

(72) Inventors: Gregory Knowles Fleizach, San Diego, CA (US); Barry Hunt, San Diego, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 275 days.

(21) Appl. No.: 15/706,955

(22) Filed: Sep. 18, 2017

(65) Prior Publication Data

US 2019/0086530 A1    Mar. 21, 2019

(51) Int. Cl.
| | | |
|---|---|---|
| G01S 13/34 | (2006.01) | |
| G01S 13/53 | (2006.01) | |
| G01S 7/35 | (2006.01) | |
| G01S 7/02 | (2006.01) | |

(52) U.S. Cl.
CPC ............ *G01S 13/348* (2013.01); *G01S 7/021* (2013.01); *G01S 7/352* (2013.01); *G01S 13/53* (2013.01)

(58) Field of Classification Search
CPC ........ G01S 13/348; G01S 13/53; G01S 7/021; G01S 7/352
USPC .......................................................... 342/132
See application file for complete search history.

(56) References Cited

U.S. PATENT DOCUMENTS

| | | | |
|---|---|---|---|
| 4,725,840 A | | 2/1988 | Orazletti |
| 4,952,936 A | | 8/1990 | Martison |
| 4,992,675 A | * | 2/1991 | Conner, Jr. ............ H03K 5/082 |
| | | | 327/312 |
| 5,111,210 A | | 5/1992 | Morse |
| 5,751,240 A | | 5/1998 | Fujita et al. |
| 5,778,022 A | * | 7/1998 | Walley .................. H04B 1/707 |
| | | | 375/149 |
| 6,888,494 B2 | | 5/2005 | Tamatsu |
| 7,215,276 B2 | | 5/2007 | Meyer |
| 7,388,537 B2 | | 6/2008 | Martinson |
| 7,512,392 B2 | * | 3/2009 | Millard ................ H04B 1/1036 |
| | | | 455/266 |

(Continued)

OTHER PUBLICATIONS

Active Filter Design Techniques, Thomas Kugelstadt, Texa Instruments Inc., 2001.*

*Primary Examiner* — Peter M Bythrow
*Assistant Examiner* — Michael W Justice
(74) *Attorney, Agent, or Firm* — Naval Information Warfare Center, Pacific; Kyle Eppele; Elliott Deaderick

(57) ABSTRACT

A device for detecting frequency modulated continuous wave radar includes an antenna connected to a bandpass filter. The antenna is configured to receive frequency modulated continuous wave (FMCW) pulses within a predetermined frequency range. A frequency mixer is connected to the bandpass filter and a synthesizer and is configured to mix a signal from the synthesizer with an output of the bandpass filter to produce basebanded data. A high-pass filter is configured to isolate short pulses pertaining to the basebanded data, and a low-pass filter is configured to isolate long pulses pertaining to the basebanded data. A microprocessor is configured to set thresholds for comparison with the outputs of the high-pass filter and the low-pass filter.

3 Claims, 5 Drawing Sheets

(56) References Cited

U.S. PATENT DOCUMENTS

| | | | |
|---|---|---|---|
| 8,760,339 B2 | 6/2014 | Kuhn | |
| 8,988,272 B2 | 3/2015 | Chernukhin | |
| 9,157,985 B1* | 10/2015 | Tardif | G01S 7/021 |
| 2004/0130477 A1* | 7/2004 | Gounalis | G01S 7/021 |
| | | | 342/13 |
| 2010/0296705 A1* | 11/2010 | Miksa | G01C 11/02 |
| | | | 382/106 |
| 2014/0292562 A1* | 10/2014 | Subramanian | G01S 7/032 |
| | | | 342/175 |
| 2016/0103204 A1* | 4/2016 | Valentine | G01S 7/022 |
| | | | 342/20 |
| 2017/0063404 A1* | 3/2017 | Langer | H04W 72/0453 |
| 2017/0248675 A1* | 8/2017 | Mullin | G01S 1/042 |

\* cited by examiner

FREQUENCY MODULATED CONTINUOUS WAVE RADAR DETECTOR

FEDERALLY-SPONSORED RESEARCH AND DEVELOPMENT

The Frequency Modulated Continuous Wave Radar Detector is assigned to the United States Government. Licensing inquiries may be directed to the Office of Research and Technical Applications, Space and Naval Warfare Systems Center Pacific, Code 72120, San Diego, Calif. 92152. Phone: (619) 553-5118; email: ssc_pac_t2@navy.mil. Reference Navy Case No. 105162.

BACKGROUND

Conventional radar detectors are generally large, expensive, and designed to detect short, high-peak power pulses. Solid-state radars are emerging that utilize long, low-peak power pulses that conventional radar detectors are not designed to detect. Traditionally, crystal video receivers are used to detect radar pulses across a large bandwidth, but such receivers do not distinguish pulses from multiple emitters and can only provide coarse frequency information. A need exists for a simplified electronic device that allows for the characterization and deinterleaving of multiple frequency modulated continuous wave radars simultaneously.

SUMMARY

The present disclosure describes a frequency modulated continuous wave radar detector. In accordance with one embodiment of the present disclosure, a device is provided that includes: an antenna connected to a bandpass filter and configured to receive frequency modulated continuous wave (FMCW) pulses within a predetermined frequency range, a frequency mixer connected to the bandpass filter and a synthesizer and configured to mix a signal from the synthesizer with an output of the bandpass filter to produce basebanded data, a high-pass filter configured to isolate short pulses pertaining to the basebanded data, a low-pass filter configured to isolate long pulses pertaining to the basebanded data, and a microprocessor configured to set thresholds for comparison with the outputs of the high-pass filter and the low-pass filter. The thresholds are determined prior to detection of the FMCW pulses by sending a signal from a microprocessor to a switch in order to connect the bandpass filter to a ground source and measure noise characteristics at a given frequency step for a predetermined period of time.

BRIEF DESCRIPTION OF THE DRAWINGS

The elements in the figures may not be drawn to scale. Some elements and/or dimensions may be enlarged or minimized, as appropriate, to provide or reduce emphasis and/or further detail.

DETAILED DESCRIPTION OF VARIOUS EMBODIMENTS

References in the specification to "one embodiment" or "an embodiment" means that a particular element, feature, structure, or characteristic described in connection with the embodiments is included in at least one embodiment. The appearances of the phrases "in one embodiment," "in some embodiments," and "in other embodiments" in various places in the specification are not necessarily all referring to the same embodiment or the same set of embodiments.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of "the," "a," or "an" are employed to describe elements and components of the embodiments herein; this is done merely for grammatical reasons and to conform to idiomatic English. This detailed description should be read to include one or at least one, and the singular also includes the plural unless it is clearly meant otherwise.

The embodiments disclosed herein describe a frequency modulated continuous wave radar detector that is suitable for, e.g., detecting short pulses and long pulses within a frequency band and distinguishing between multiple FMCW radars.

Figure 1:
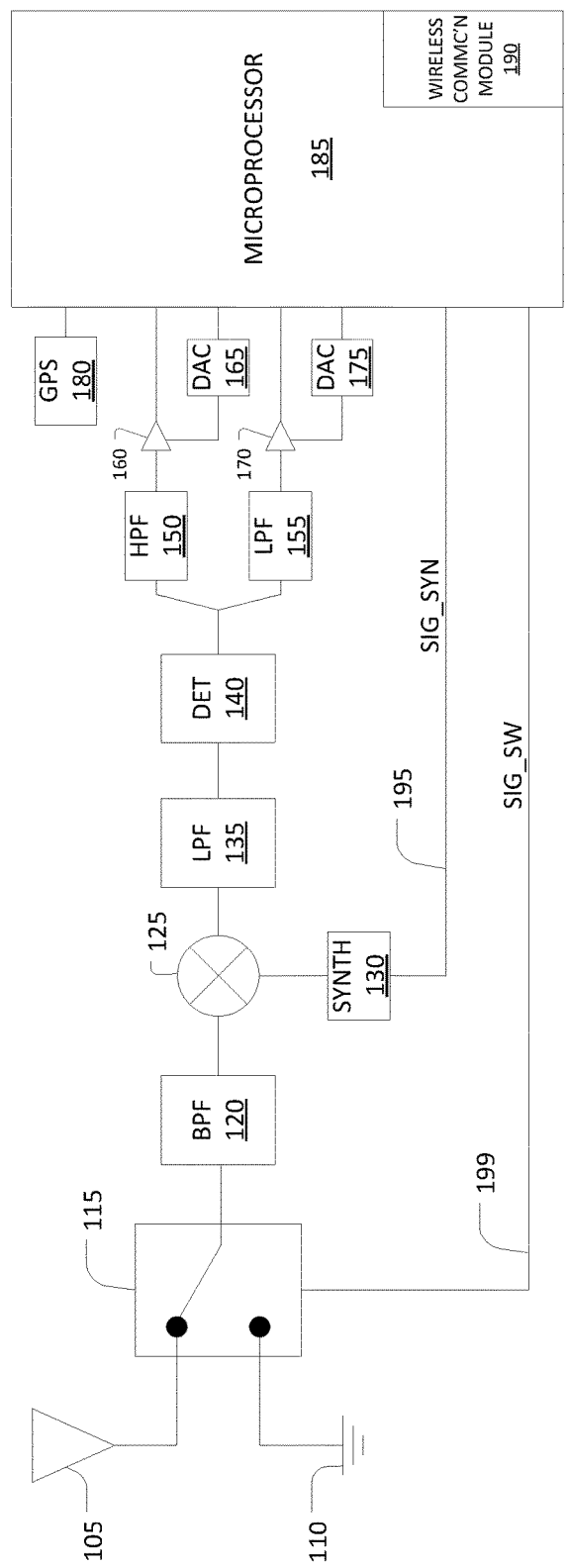
FIG. 1 is block diagram of an embodiment of a device in accordance with the Frequency Modulated Continuous Wave Radar Detector.

FIG. 1 shows an example diagram illustrating an embodiment of a device 100 in accordance with the Frequency Modulated Continuous Wave Radar Detector. Device 100 may include an antenna 105, which may be connected to a bandpass filter 120 via a switch 115. Antenna 105 may be configured to receive FMCW pulses within a predetermined frequency range. In some embodiments, the frequency range may be about 300 MHz within a given frequency band. Configuration of device 100 for particular applications/usage may dictate the appropriate frequency range, and the frequency range may be adjusted as appropriate. In some embodiments, the frequency range may be greater than 300 MHz (e.g., about 400 MHz) or less than 300 MHz (e.g., about 200 MHz).

Bandpass filter 120 may be configured to output filtered FMCW pulses within a range of about 9000 MHz to about 9300 MHz. This frequency range is part of the X-band, which comprises the frequency band of about 8-12 GHz. In some embodiments, bandpass filter 120 may be configured to filter a different frequency range within the X-Band with different upper and lower limits (e.g., about 8500 MHz-about 8900 MHz, about 10 GHz-about 10.3 GHz, etc.) depending on the device configuration. No one particular range within a frequency band is considered controlling. In some embodiments, bandpass filter 120 may be configured to filter in an entirely different frequency band than the X-band. For example, device configurations (which may include a different antenna and synthesizer for the particular frequency band chosen) may support bandpass filtering in a different frequency band such as the S-band (about 2-4 GHz), the C-band (about 4-8 GHz), etc. No one particular frequency band is considered controlling. Additionally, bandpass filter 120 may utilize frequency steps of about 50 MHz. In some embodiments, bandpass filter 120 may utilize a different frequency step depending on device configurations. The frequency steps may be larger (e.g., about 60 MHz) or smaller (e.g., about 40 MHz) as appropriate.

A frequency mixer 125 may be connected to bandpass filter 120 and a synthesizer 130, which may be connected to microprocessor 185 via signal line 195. Synthesizer 130 may receive a signal SIG_SYN from microprocessor 185 to initiate change to a next frequency step. Frequency mixer 125 may be configured to mix a signal from synthesizer 130 with an output of bandpass filter 120 to produce basebanded data.

Producing basebanded data may comprise "mixing" or "de-modulation." For example, if an incoming signal is centered at 8900 MHz and an oscillator frequency is 9000 MHz, the mixing of the two signals (from trigonometric identities) produces copies at:
f1=9000 MHz−8900 MHz=100 MHz, and
f2=9000 MHz+8900 MHz=17,900 MHz.
As a result, basebanded data may be considered a signal that is not modulated at an RF frequency, so it may be near 0 Hz in the frequency range. Therefore, a basebanded signal simply contains the pulse (or data).

A low-pass filter 135 may be configured to receive the basebanded data and filter it to remove an image. Removal of an image may comprise removing the frequency copy of the basebanded data containing an undesired frequency. Therefore, in keeping with the example above, the f2 signal would be the removed image. Low-pass filter 135 may be connected to a detector 140, which may be used in conjunction with a high-pass filter 150 and a low-pass filter 155 in order to isolate short pulses (with high-pass filter 150) and long pulses (with low-pass filter 155) of the filtered basebanded data.

A digital-to-analog converter (DAC) 165 may provide an analog threshold for comparison with an output of high-pass filter 150 in order to detect short pulses. DAC 165 may convert a digital threshold from a microprocessor 185 to an analog threshold. The analog threshold from DAC 165 may be compared to the output of high-pass filter 150 using a comparator 160. If the output from high-pass filter 150 is above the analog threshold, then comparator 160 may output a positive signal to microprocessor 185, which may store the detection results. If the output from high-pass filter 150 is below the analog threshold from DAC 165, comparator 160 may output a negative signal indicating no detection.

DAC 175 may provide an analog threshold for comparison with an output of low-pass filter 155 in order to detect long pulses. DAC 175 may convert a digital threshold from microprocessor 185 to an analog threshold. The analog threshold from DAC 175 may be compared to the output of low-pass filter 155 using a comparator 170. If the output from low-pass filter 155 is above the analog threshold, then comparator 170 may output a positive signal to microprocessor 185, which may store the detection results. If the output from low-pass filter 155 is below the analog threshold from DAC 175, comparator 170 may output a negative signal indicating no detection.

Microprocessor 185 may be configured to set thresholds, which may be digital thresholds, that may be used for comparison with outputs from various filters (as described above). The thresholds may be determined prior to detection of FMCW pulses by sending a signal SIG_SW from microprocessor 185 to switch 115, via signal line 199, in order to connect bandpass filter 120 to a ground source 110. Signal SIG_SW may be used to connect bandpass filter 120 to either antenna 105 or ground source 110. After connection to ground source 110, the noise characteristics are measured at a given frequency step for a predetermined period of time (e.g., 1 ms). Microprocessor 185 may include a non-transitory storage medium (not shown) for storing data.

A global-positioning system (GPS) module 180 may be connected to microprocessor 185 and may be configured to provide a location of device 100, as well as timestamp information regarding the FMCW pulses. In some embodiments, GPS module 180 may be an integrated circuit. The data regarding GPS location and the timestamp information may be stored in the non-transitory storage medium.

Microprocessor 185 may include a wireless communication module 190 that is configured to send alert information regarding the FMCW pulses to another device. Wireless communication module 190 may utilize one of various wireless communication protocols depending on the preferred configuration of device 100 (e.g., Bluetooth, Zigbee, IEEE 802.11, etc.). In some embodiments, wireless communication module 190 may be an integrated circuit. In other embodiments, wireless communication module 190 may be a separate integrated circuit connected to microprocessor 185.

Figure 3A:
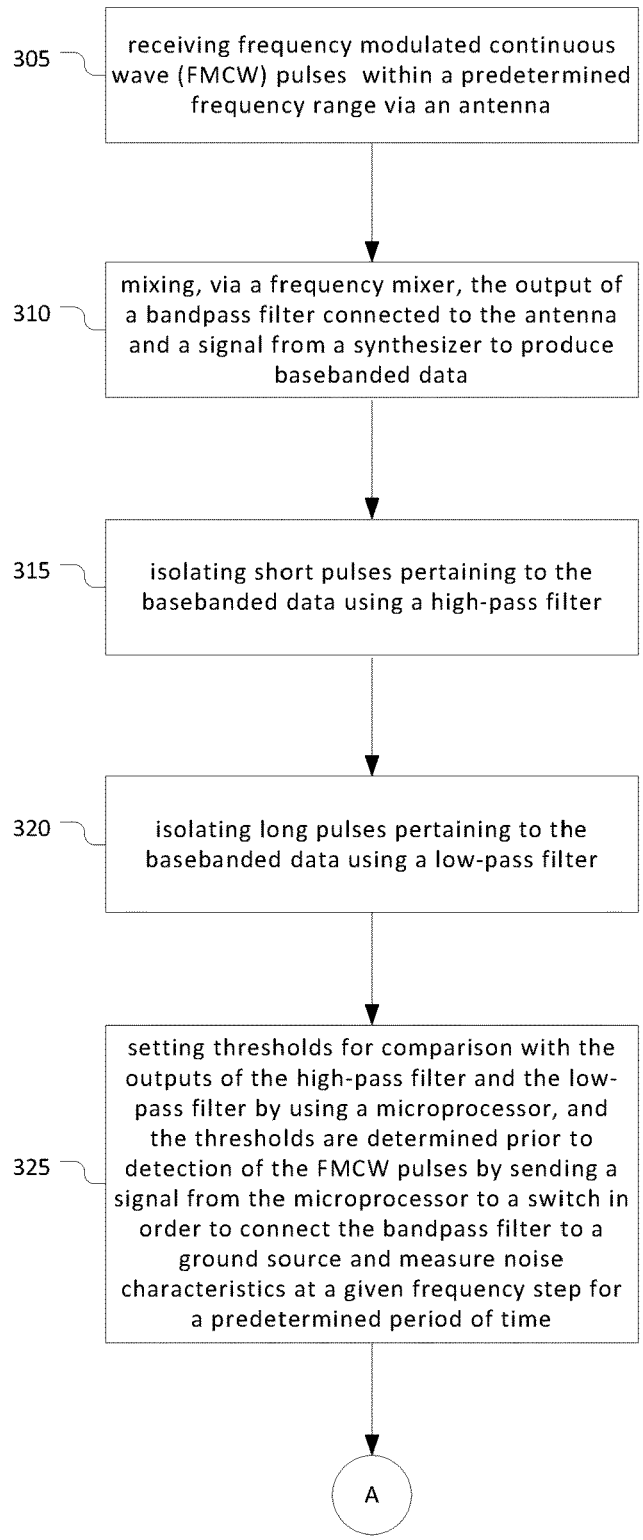
FIGS. 3A-3B illustrate a flowchart diagram of an embodiment of a method in accordance with the Frequency Modulated Continuous Wave Radar Detector.
Figure 3B:
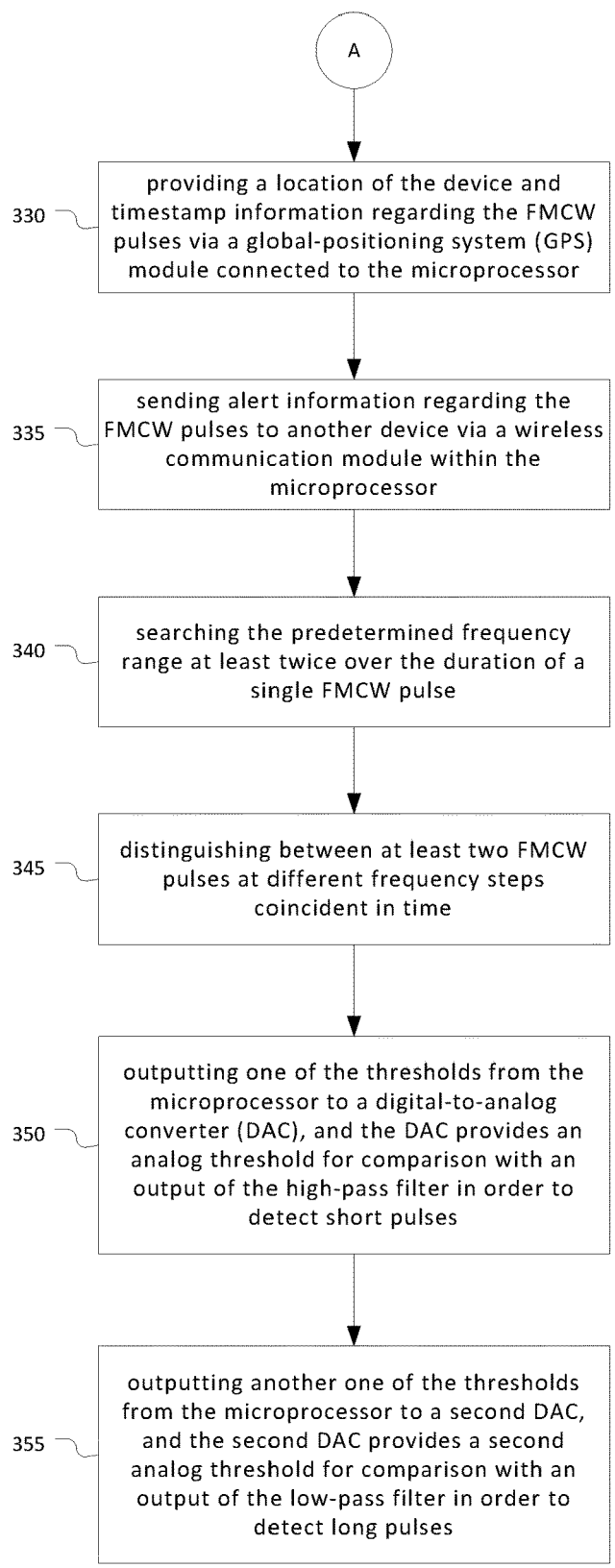

FIGS. 3A-3B show flowchart diagrams illustrating an embodiment of a method 300 in accordance with the Frequency Modulated Continuous Wave Radar Detector. Portions of method 300 may be implemented as a series of modules, either functioning alone or in concert with physical electronic and computer hardware devices. Such modules may be utilized separately and/or together locally and or remotely to form a program product thereof, which may be implemented through recordable media. Some of the steps of method 300 may be stored within the non-transitory storage medium of microcontroller 185, wherein the steps are represented by computer-readable programming code.

For illustrative purposes, method 300 will be discussed with reference to the steps being performed in accordance with the components of device 100. Additionally, while FIGS. 3A-3B show an embodiment of method 300, other embodiments of method 300 may contain fewer or more steps. Further, while in some embodiments the steps of method 300 may be performed as shown in FIGS. 3A-3B, in other embodiments the steps may be performed in a different order, or certain steps may occur simultaneously with one or more other steps. The abovementioned considerations regarding method 300 are also applicable to method 400 shown in FIG. 4.

In FIG. 3A, method 300 begins at step 305, which involves receiving FMCW pulses within a predetermined frequency range via antenna 105.

Step 310 involves mixing, via a frequency mixer 125, the output of bandpass filter 120 connected to antenna 105 and a signal from a synthesizer 130 to produce basebanded data.

Step 315 involves isolating short pulses pertaining to the basebanded data using high-pass filter 150.

Step 320 involves isolating long pulses pertaining to the basebanded data using low-pass filter 155. In some embodiments, as previously explained with respect to device 100, low-pass filter 135 may receive the basebanded data from frequency mixer 125 and may filter the basebanded data to remove an image prior to the isolating by high-pass filter 150 and low-pass filter 155.

Step 325 involves setting thresholds, which may be digital thresholds, for comparison with the outputs of high-pass filter 150 and low-pass filter 155 by using microprocessor 185. The thresholds are determined prior to detection of the FMCW pulses by sending a signal SIG_SW from microprocessor 185 to switch 115 via signal line 199 in order to connect bandpass filter 120 to ground source 110 and measure noise characteristics at a given frequency step for a predetermined period of time (e.g., 1 ms). The predetermined period of time may vary depending on desired device configurations. For example, the predetermined period of time may be greater than or less than 1 ms (e.g., 0.5 ms).

In FIG. 3B, step 330 involves providing a location of device 100 and timestamp information regarding the FMCW pulses via global-positioning system (GPS) module 180 connected to microprocessor 185.

Step 335 involves sending alert information regarding the FMCW pulses to another device via wireless communication module 190 within microprocessor 185. In some embodiments, the sending of alert information may be programmed such that it is sent on a schedule. For example, the alert information may be programmed to be sent recurringly and/or after a specific period of time has elapsed (e.g., hourly or after one hour) or at a particular date/time. Such programming may be an option in addition to or in lieu of sending alert information using other parameters, e.g., upon detection of a pulse or upon receiving a request from another device via the wireless communication module 190.

Figure 2:
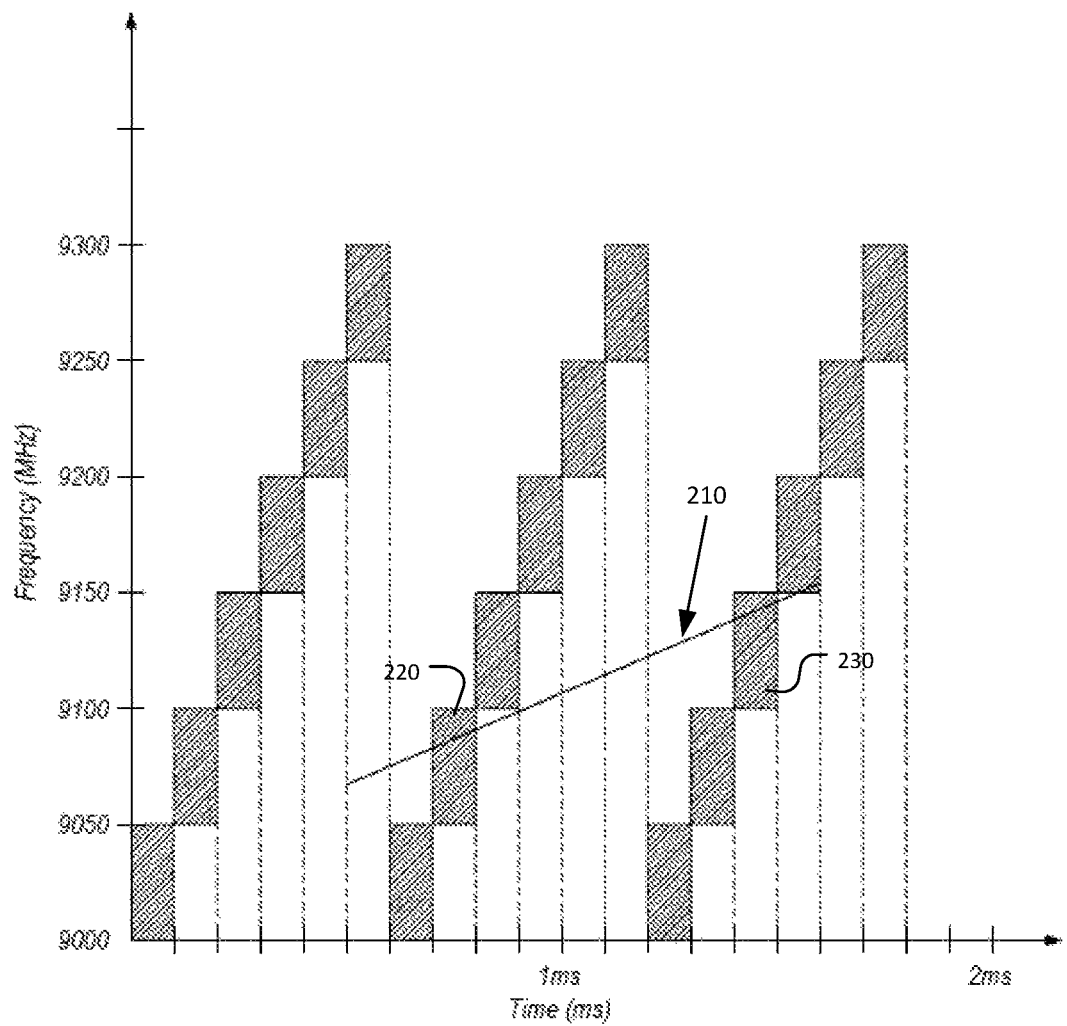
FIG. 2 is a timing diagram illustrating a search of a frequency band during a frequency modulated continuous wave pulse.

Step 340 involves searching the predetermined frequency range at least twice over the duration of a single FMCW pulse. FIG. 2 shows an example timing diagram 200 illustrating a search of a frequency range in a frequency band during an FMCW pulse, which is shown as signal 210. In this example, signal 210 is detected in multiple search windows including windows 220 and 230, which occur at different times.

In FIG. 3B, step 345 involves distinguishing between at least two FMCW pulses at different frequency steps coincident in time. Although not shown in FIG. 2, in some embodiments at least one other signal may be present in addition to signal 210. Because of the repeated searching of the frequency range across a particular duration of time that is shorter than the length of the signal, it is possible to detect multiple distinct signals having different frequencies.

Although timing diagram 200 shows particular search parameters, other parameters may be used for searching a frequency range during a particular period of time during an FMCW pulse (e.g., other frequency ranges, lengths of time, number of search windows, number and size of frequency steps, duration of each search window, etc.). Search parameters may be set in accordance with a chosen device configuration and may change depending on the desired application of the device.

In FIG. 3B, step 350 involves outputting one of the thresholds from microprocessor 185 to DAC 165, and DAC 165 provides an analog threshold for comparison with an output of high-pass filter 150 in order to detect short pulses.

Step 355 involves outputting another one of the thresholds from microprocessor 185 to DAC 175, and DAC 175 provides an analog threshold for comparison with an output of low-pass filter 155 in order to detect long pulses.

Figure 4:
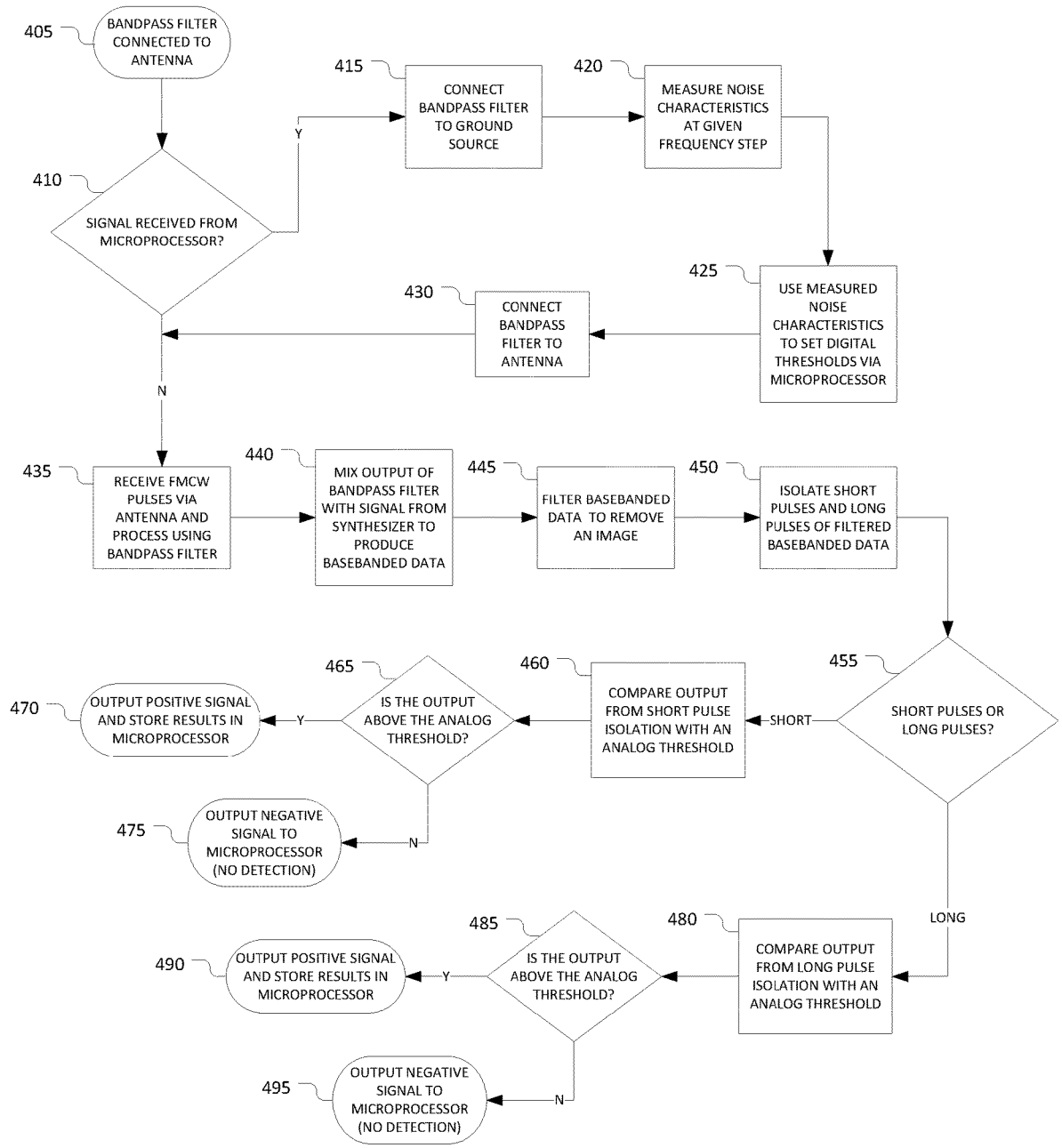
FIG. 4 is a flowchart diagram of an embodiment of a method in accordance with the Frequency Modulated Continuous Wave Radar Detector.

FIG. 4 shows a flowchart diagram illustrating an embodiment of a method 400 in accordance with the Frequency Modulated Continuous Wave Radar Detector.

Method 400 begins at step 405, which involves connecting bandpass filter 120 to antenna 105. Step 410 involves checking if a signal, shown as SIG_SW in FIG. 1, has been received from microprocessor 185 at switch 115. If "yes," then method 400 proceeds to step 415 and bandpass filter 120 is connected to ground source 110, after which noise characteristics are measured at a given frequency step as shown in step 420. Step 425 involves using the measured noise characteristics to set thresholds, which may be digital thresholds, via microprocessor 185. Step 430 involves reconnecting bandpass filter 120 to antenna 105, after which method 400 proceeds to step 435.

If the answer at step 410 is "no," then method 400 proceeds directly to step 435. Step 435 involves receiving FMCW pulses via antenna 105 and processing the FMCW pulses using bandpass filter 120. Step 440 involves mixing the output of bandpass filter 120 with a signal from synthesizer 130 to produce basebanded data. Step 445 involves filtering the basebanded data to remove an image, wherein the filtering may include using low-pass filter 135.

Steps 450 and 455 involve isolating short pulses and long pulses of the filtered basebanded data and may include using detector 140, high-pass filter 150, and low-pass filter 155.

If short pulses are isolated, then method 400 proceeds to step 460 and the output from the short pulse isolation is compared with an analog threshold provided by DAC 165 using comparator 160. Step 465 determines if the output from high-pass filter 150 pertaining to the short pulses is above the analog threshold of DAC 165. If "yes," then a positive signal is output by comparator 160 indicating detection, and the results are stored in microprocessor 185 (as shown in step 470). If "no," then a negative signal is output by comparator 160 indicating no detection has occurred (as shown in step 475).

If long pulses are isolated, then method 400 proceeds to step 480 and the output from the long pulse isolation is compared with an analog threshold provided by DAC 175 using comparator 170. Step 485 determines if the output from low-pass filter 155 pertaining to the long pulses is above the analog threshold of DAC 175. If "yes," then a positive signal is output by comparator 170 indicating detection, and the results are stored in microprocessor 185 (as shown in step 490). If "no," then a negative signal is output by comparator 170 indicating no detection has occurred (as shown in step 495).

The use of any examples, or exemplary language ("e.g.," "such as," etc.), provided herein is merely intended to better illuminate and is not intended to pose a limitation on the scope of the subject matter unless otherwise claimed. No language in the specification should be construed as indicating that any non-claimed element is essential.

Many modifications and variations of the Frequency Modulated Continuous Wave Radar Detector are possible in light of the above description. Within the scope of the appended claims, the embodiments of the device and method described above may be practiced otherwise than as specifically described. The scope of the claims is not limited to the disclosed implementations and embodiments but extends to other implementations and embodiments as may be contemplated by those having ordinary skill in the art.

What is claimed is:

1. A device comprising:
    an antenna connected to a bandpass filter and configured to receive frequency modulated continuous wave (FMCW) pulses within a predetermined frequency range;
    a frequency mixer connected to the bandpass filter and a synthesizer and configured to mix a signal from the synthesizer with an output of the bandpass filter to produce basebanded data;
    a high-pass filter configured to isolate short pulses pertaining to the basebanded data;
    a low-pass filter configured to isolate long pulses pertaining to the basebanded data;

a microprocessor configured to set thresholds for comparison with outputs of the high-pass filter and the low-pass filter, wherein the thresholds are determined prior to detection of the FMCW pulses by sending a signal from the microprocessor to a switch in order to connect the bandpass filter to a ground source and measure noise characteristics at a given frequency step for a predetermined period of time;

a digital-to-analog converter (DAC) configured to receive one of the thresholds from the microprocessor and output an analog threshold for comparison with an output of the high-pass filter in order to detect short pulses; and a second DAC configured to receive another one of the thresholds from the microprocessor and output a second analog threshold for comparison with an output of the low-pass filter in order to detect long pulses.

2. A method comprising:

receiving frequency modulated continuous wave (FMCW) pulses within a predetermined frequency range via an antenna;

mixing, via a frequency mixer, the output of a bandpass filter connected to the antenna and a signal from a synthesizer to produce basebanded data;

isolating short pulses pertaining to the basebanded data using a high-pass filter;

isolating long pulses pertaining to the basebanded data using a low-pass filter;

setting thresholds for comparison with outputs of the high-pass filter and the low-pass filter by using a microprocessor, wherein the thresholds are determined prior to detection of the FMCW pulses by sending a signal from the microprocessor to a switch in order to connect the bandpass filter to a ground source and measure noise characteristics at a given frequency step for a predetermined period of time;

outputting one of the thresholds from the microprocessor to a digital-to-analog converter (DAC), wherein the DAC provides an analog threshold for comparison with an output of the high-pass filter in order to detect short pulses; and outputting another one of the thresholds from the microprocessor to a second DAC, wherein the second DAC provides a second analog threshold for comparison with an output of the low-pass filter in order to detect long pulses.

3. A device comprising:

an antenna configured to receive frequency modulated continuous wave (FMCW) pulses within a predetermined frequency range;

a switch configured to connect a bandpass filter to either the antenna or a ground source, wherein the bandpass filter when connected to the antenna filters the received FMCW pulses and outputs filtered FMCW pulses;

a frequency mixer connected to the bandpass filter and a synthesizer and configured to mix a signal from the synthesizer with the output of the bandpass filter to produce basebanded data;

a low-pass filter configured to receive the basebanded data from the frequency mixer and filter the basebanded data to remove an image;

a high-pass filter configured to isolate short pulses of the filtered basebanded data;

a digital-to-analog converter (DAC) providing an analog threshold for comparison with an output of the high-pass filter in order to detect short pulses;

a second low-pass filter configured to isolate long pulses of the filtered basebanded data;

a second DAC providing a second analog threshold for comparison with an output of the second low-pass filter in order to detect long pulses; and a microprocessor configured to set digital thresholds that are provided to the DACs, wherein the digital thresholds are determined prior to detection of the FMCW pulses by sending a signal from the microprocessor to the switch in order to connect the bandpass filter to the ground source and measure noise characteristics at a given frequency step for a predetermined period of time.

* * * * *